United States Patent [19]

Miller

[11] 4,306,439
[45] Dec. 22, 1981

[54] SAFETY DEVICE

[75] Inventor: Robert F. Miller, Racine, Wis.

[73] Assignee: Modine Manufacturing Company, Racine, Wis.

[21] Appl. No.: 110,383

[22] Filed: Jan. 7, 1980

[51] Int. Cl.³ .............................................. F16P 3/00
[52] U.S. Cl. ..................................... 72/199; 68/266; 101/216; 74/612
[58] Field of Search ................ 72/199, 166–175, 72/176–182; 74/612, 613, 609; 101/216; 68/249, 264, 266; 100/99

[56] References Cited

U.S. PATENT DOCUMENTS

| | | | |
|---|---|---|---|
| 1,081,380 | 12/1913 | Gubbins | 68/266 |
| 1,148,133 | 7/1915 | White | 68/266 |
| 1,240,751 | 9/1917 | Marx | 68/249 |
| 1,883,258 | 10/1932 | Wood | 101/216 |
| 1,915,702 | 6/1933 | Tinkham | 68/266 |
| 2,015,303 | 9/1935 | Feldman | 68/266 UX |
| 2,163,473 | 6/1939 | Simon | 74/612 |
| 3,498,217 | 3/1970 | Kletti | 101/216 |

*Primary Examiner*—Milton S. Mehr
*Attorney, Agent, or Firm*—Wegner, Stellman, McCord, Wood & Dalton

[57] ABSTRACT

A safety device for roll forming apparatus that has a pair of oppositely rotating pressure rollers with parallel axes and peripheral cylindrical surfaces which define between them a gripping and contact gap. The safety device comprises a pair of safety rollers located rearwardly of the pressure rollers and having peripheral portions spaced apart a distance greater than the gap between the pressure rollers and means for rotating the safety rollers in a rearward direction with respect to the pressure rollers in order to engage and reject foreign articles placed between the safety rollers.

9 Claims, 2 Drawing Figures

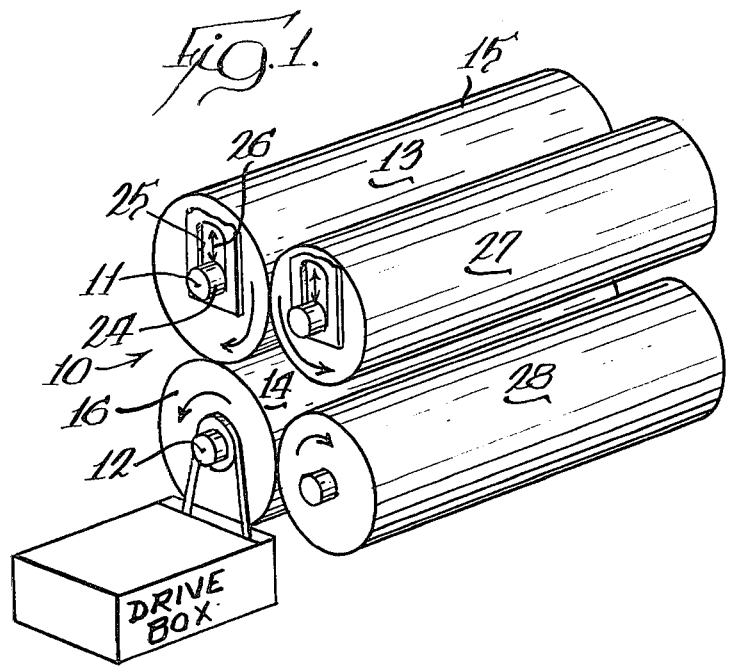
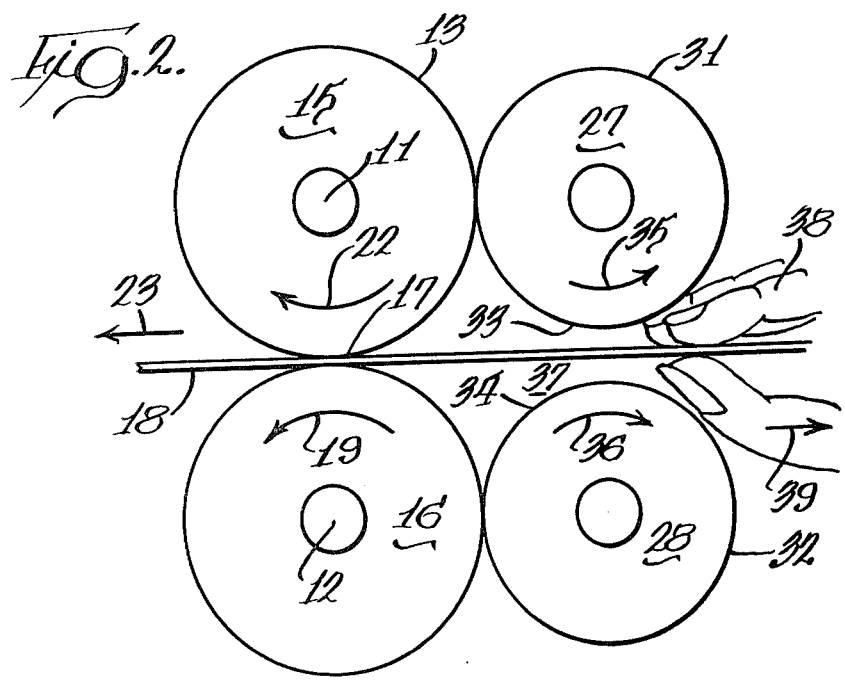

SAFETY DEVICE

BACKGROUND OF THE INVENTION

In many types of equipment from laundry machines to metal forming apparatus an essential part is a pair of oppositely rotating pressure rollers with parallel axes and peripheral surfaces which define between them a gripping and contact gap in which articles are gripped by the rollers and urged forwardly between them in order to exert pressure on the articles. There is a fundamental danger in this type of apparatus in that foreign articles are gripped, pressed and propelled forwardly between the rollers in the same manner as the intended articles. This can be dangerous if a worker should happen to get a portion of his body such as a hand accidentally inserted between the pressure rollers.

In the safety device of this invention there are provided a pair of counterrotating rollers that are located forwardly of the pressure rollers and that are spaced apart so as to engage the foreign article before it can reach the pressure rollers and project it rearwardly away from the pressure rollers.

The prior art known to the applicant at the time of filing this application consists of U.S. Pat. Nos. 1,081,380; 1,148,133; 1,240,751; 1,883,258; 1,915,702; 2,163,473 and 3,498,217.

BRIEF DESCRIPTION OF THE DRAWINGS

FIG. 1 is a semi-schematic view of metal forming pressure rollers with a safety device embodying the invention.

FIG. 2 is a semi-schematic end elevational view of the rollers of FIG. 1 and illustrating the sheet of metal passing between the pressure rollers in the customary manner and a foreign object, the hand of a worker, being ejected by the safety rollers.

DESCRIPTION OF THE PREFERRED EMBODIMENT

In the embodiment illustrated in the drawings the pressure rollers 10 have parallel axes 11 and 12 and cylindrical pressure surfaces 13 and 14 in contact with each other. The pressure rollers 10 as illustrated include an upper roller 15 and a lower roller 16 each arranged horizontally. The actual apparatus could of course include more rollers, if desired, but only a single pair is shown for illustrative purposes.

The pair of rollers 15 and 16 define between them a gripping and pressure gap illustrated at 17 in FIG. 2. This gap provides space for passing articles to be acted upon by the pressure rollers as illustrated by the sheet 18 of metal in FIG. 2 which is pressure deformed by the apparatus.

The pair of rollers 15 and 16 are in contact with each other at their pressure surfaces 13 and 14 when there is no article passing therebetween as illustrated in FIG. 1 and are in pressure contact with the article 18 when the article is passing therebetween. In either event, this contact causes the rotating lower roller 16 which in the illustrated embodiment is rotated in a counterclockwise direction 19 to rotate the opposite roller 16 in the opposite or clockwise direction 22. This rotation and the gripping of the article 18 therebetween causes the article to be propelled from the rear forwardedly as indicated by the arrow 23.

In order to provide for relative movement between the rollers 15 and 16 in order to vary the width of the gap 17 to accommodate articles 18 of varying thicknesses the pair of pressure rollers are mounted for relative movement toward and away from each other. This relative movement mounting is illustrated schematically in FIG. 1 where each axle end 24 of the upper roller 15 is mounted in a guide 25 and resiliently but yieldably urged toward the other roller 16 as indicated by the double ended arrow 26.

The safety device for the apparatus of this type comprises a pair of safety rollers 27 and 28 located rearwardly or in the direction opposite to the direction of movement of the article 18 with respect to the pressure rollers 15 and 16. These safety rollers 27 and 28 have cylindrical peripheral portions or surfaces 31 and 32 spaced apart a distance greater than the width of the pressure gap 17. Means are provided for rotating these safety rollers 27 and 28 in a rearward direction in relation to the forward direction 19 and 22 of the pressure rollers so as to move their closest adjacent peripheral surface portions 33 and 34 relatively rearwardly so as to reject a foreign article such as the hand 38 and propel it away from the pressure rollers 15 and 16 and away from the safety rollers 27 and 28.

As illustrated schematically in FIG. 1 one of the safety rollers, here the upper roller 27, is mounted for yieldable movement away from the other roller 28 in the same way that the upper roller 13 is yieldably mounted.

In order to rotate the upper safety roller 27 rearwardly as indicated by the arrow 35 this roller has its peripheral surface 31 in contact with the surface 13 of the upper pressure roller 15. Similarly, in order to rotate the lower safety roller 28 in the desired direction 36 the lower safety roller 28 is in peripheral contact with the lower pressure roller 16.

As the space 37 between the safety rollers 27 and 28 is greater than the spacing 17 between the pressure rollers 15 and 16, and therefore is greater than the thickness of the article 18 passing between the pressure rollers 15 and 16, no pressure is exerted on the article 18 being pressed. As a matter of fact, therefore, the spacing between the safety rollers 27 and 28 is greater than the spacing 17 between the pressure rollers and therefore greater than the thickness of the articles 18 being pressed but the spacing 37 is less than the thickness of the foreign article that is ejected illustrated by the hand 38.

As can be seen from the above description taken in conjunction with the illustrated embodiment, the safety device of this invention is simple yet effective because the spacing of the safety rollers 37 is great enough to permit easy passage of the articles 18 to the pressure rollers 15 and 16 but is close enough to engage and eject the foreign article in a rearward direction 39. Also, the safety rollers 27 and 28 of this invention are easily rotated in the proper rearward direction by having them engage the corresponding pressure rollers 15 and 16 and thus receive rotational power therefrom.

Because no great pressure is exerted by or on the safety rollers 27 and 28 they made be made from inexpensive material such as wood or plastic. Also, if desired, the safety rollers could serve the dual function of cleaning continuously the pressure rollers by providing the surfaces 31 and 32 of the safety rollers with felt or other suitable cleaning material (not shown).

Having described my invention as related to the embodiment shown in the accompanying drawings, it is my intention that the invention be not limited by any of the details of description unless otherwise specified, but rather be construed broadly within its spirit and scope as set out in the appended claims.

I claim:

1. An apparatus having a pair of oppositely rotating pressure rollers with parallel axes and peripheral surfaces which define between them a gripping and pressure gap urging articles gripped by said pressure rollers on opposite surfaces of said articles from a rearward position forwardly, a safety device, comprising: a pair of safety rollers located rearwardly of said pressure rollers and each adjacent to a said opposite surface of said articles and having peripheral portions spaced apart a distance greater than said gap; and means for rotating both said safety rollers in a rearward direction such that their closest peripheral surface portions move away from each other and away from said pressure rollers to reject foreign articles at either or both sides of said articles and propel said foreign articles rearwardly away from each of said pressure rollers.

2. The safety device of claim 1 wherein said means for rotating said safety rollers comprises means for rotating a first one of said pressure rollers with a second of said pressure rollers being in friction contact with said first or with an article passing therebetween for rotating both said pressure rollers forwardly and in opposite arcuate directions due to said frictional contact.

3. The safety device of claim 2 wherein means are provided for mounting said pressure rollers for relative yieldable movement away from each other to accommodate articles of varying thicknesses, said yieldable means pressing the pressure rollers into said pressure contact.

4. The safety device of claim 1 wherein a first one of said safety rollers is in contact with a first one of said pressure rollers for rotation therewith in an opposite direction and a second one of said safety rollers is in contact with a second of said pressure rollers for rotation in said opposite direction, thereby providing said rotation of said safety rollers in said rearward direction.

5. The safety device of claim 4 wherein means are provided for mounting said safety rollers for yieldable relative movement away from each other.

6. The safety device of claim 1 wherein said means for rotating said safety rollers comprises means for rotating a first one of said pressure rollers with a second of said pressure rollers being in friction contact with said first or with an article passing therebetween for rotating both said pressure rollers forwardly and in opposite arcuate directions due to said frictional contact, and wherein a first one of said safety rollers is in contact with a first one of said pressure rollers for rotation therewith in the opposite direction and a second one of said safety rollers is in contact with a second one of said pressure rollers, thereby providing said rotation of said safety rollers in said rearward direction.

7. The safety device of claim 6 wherein means are provided for mounting said pressure rollers for relative yieldable movement away from each other to accommodate articles of varying thicknesses, said yieldable means pressing the pressure rollers into said pressure contact.

8. The safety device of claim 6 wherein means are provided for mounting said safety rollers for yieldable relative movement away from each other.

9. The safety device of claim 6 wherein means are provided for mounting said pressure rollers for relative yieldable movement away from each other to accommodate articles of varying thicknesses, said yieldable means pressing the pressure rollers into said pressure contact, and wherein means are provided for mounting said safety rollers for yieldable relative movement away from each other.

* * * * *